United States Patent
Nakagawa

(10) Patent No.: US 8,348,502 B2
(45) Date of Patent: Jan. 8, 2013

(54) LIGHTING APPARATUS

(75) Inventor: Norifumi Nakagawa, Tokyo (JP)

(73) Assignee: Nikon Corporation, Tokyo (JP)

( * ) Notice: Subject to any disclaimer, the term of this patent is extended or adjusted under 35 U.S.C. 154(b) by 338 days.

(21) Appl. No.: 12/801,805

(22) Filed: Jun. 25, 2010

(65) Prior Publication Data
US 2010/0329302 A1 Dec. 30, 2010

(30) Foreign Application Priority Data

Jun. 29, 2009 (JP) .................................. 2009-154284
Jun. 10, 2010 (JP) .................................. 2010-133259

(51) Int. Cl.
*G01J 5/00* (2006.01)
*G01K 3/00* (2006.01)

(52) U.S. Cl. ........ 374/130; 374/137; 374/120; 374/124; 374/112

(58) Field of Classification Search .................. 374/130, 374/137, 120, 112, 124
See application file for complete search history.

(56) References Cited

U.S. PATENT DOCUMENTS

| | | | |
|---|---|---|---|
| 7,686,505 B2* | 3/2010 | Meltzer et al. ................. | 374/137 |
| 8,152,365 B2* | 4/2012 | Timans ......................... | 374/130 |
| 2003/0002038 A1* | 1/2003 | Mawatari ...................... | 356/300 |

FOREIGN PATENT DOCUMENTS

| | | |
|---|---|---|
| CN | 1397014 A | 2/2003 |
| JP | U-04-041637 | 4/1992 |
| JP | A-04-283435 | 10/1992 |
| JP | A-5-216096 | 8/1993 |
| JP | A-5-333408 | 12/1993 |
| JP | A-2000-098347 | 4/2000 |
| JP | A-2009-075401 | 4/2009 |

OTHER PUBLICATIONS

Japanese Office Action issued in Application No. 2010-133259; Dated Jun. 28, 2011 (With Translation).

* cited by examiner

*Primary Examiner* — Mirellys Jagan
(74) *Attorney, Agent, or Firm* — Oliff & Berridge, PLC

(57) ABSTRACT

There is provided a lighting apparatus that is capable of accurately measuring the temperature of an optical member that transmits therethrough light emitted from a light source without blocking the optical path of the light. A lighting apparatus including: a light source that emits light, an optical member that transmits therethrough the light emitted from the light source, a temperature measuring section that measures a temperature of a first measurement point on the optical member, a storing section that stores therein profile information representing a correlation between the temperature of the first measurement point and a temperature of a second measurement point, where the second measurement point is on the optical member and separated away from the first measurement point, and a temperature determining section that determines the temperature of second measurement point based on the temperature of the first measurement point measured by the temperature measuring section and the profile information stored in the storing section.

11 Claims, 11 Drawing Sheets

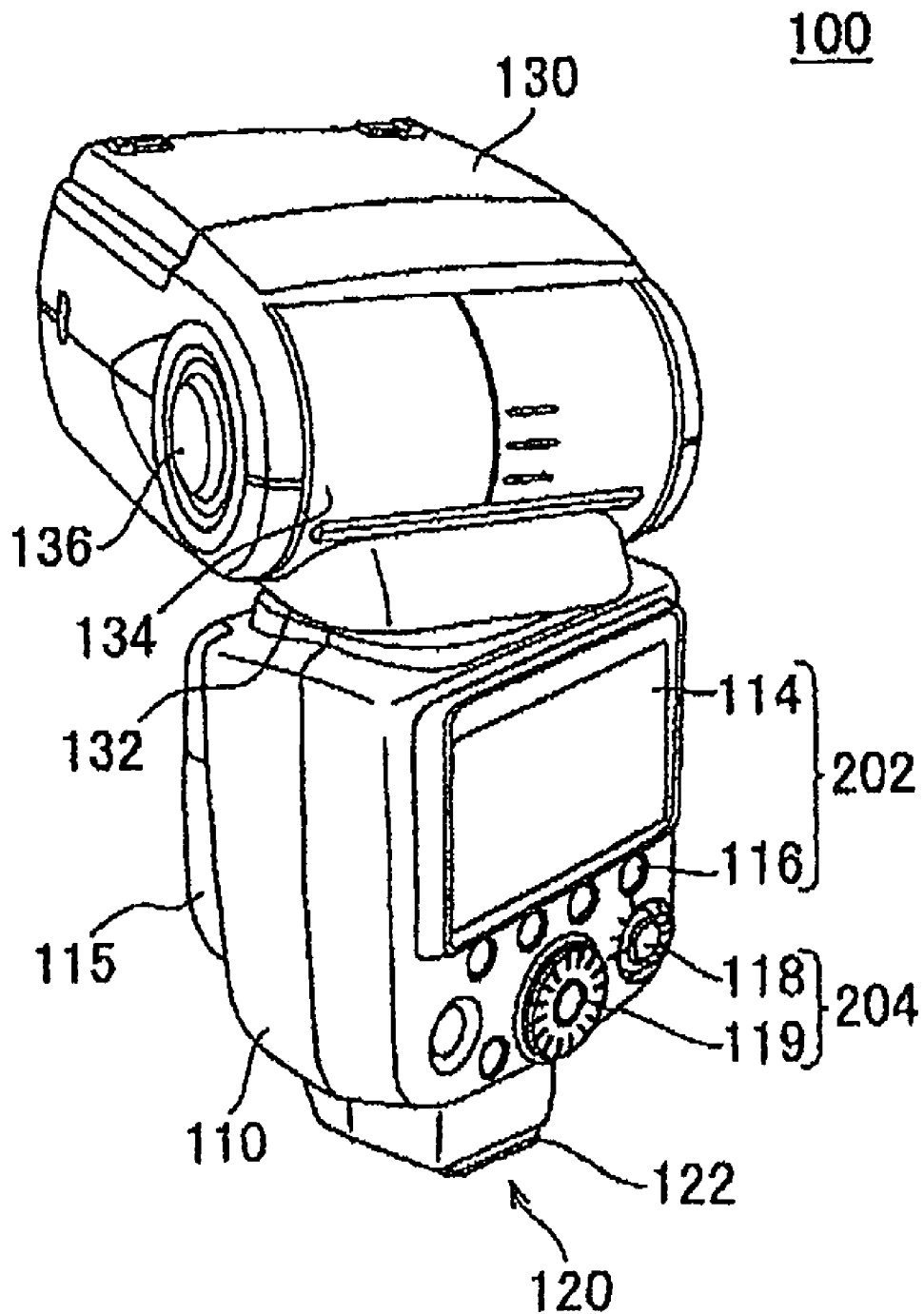
F I G . 2

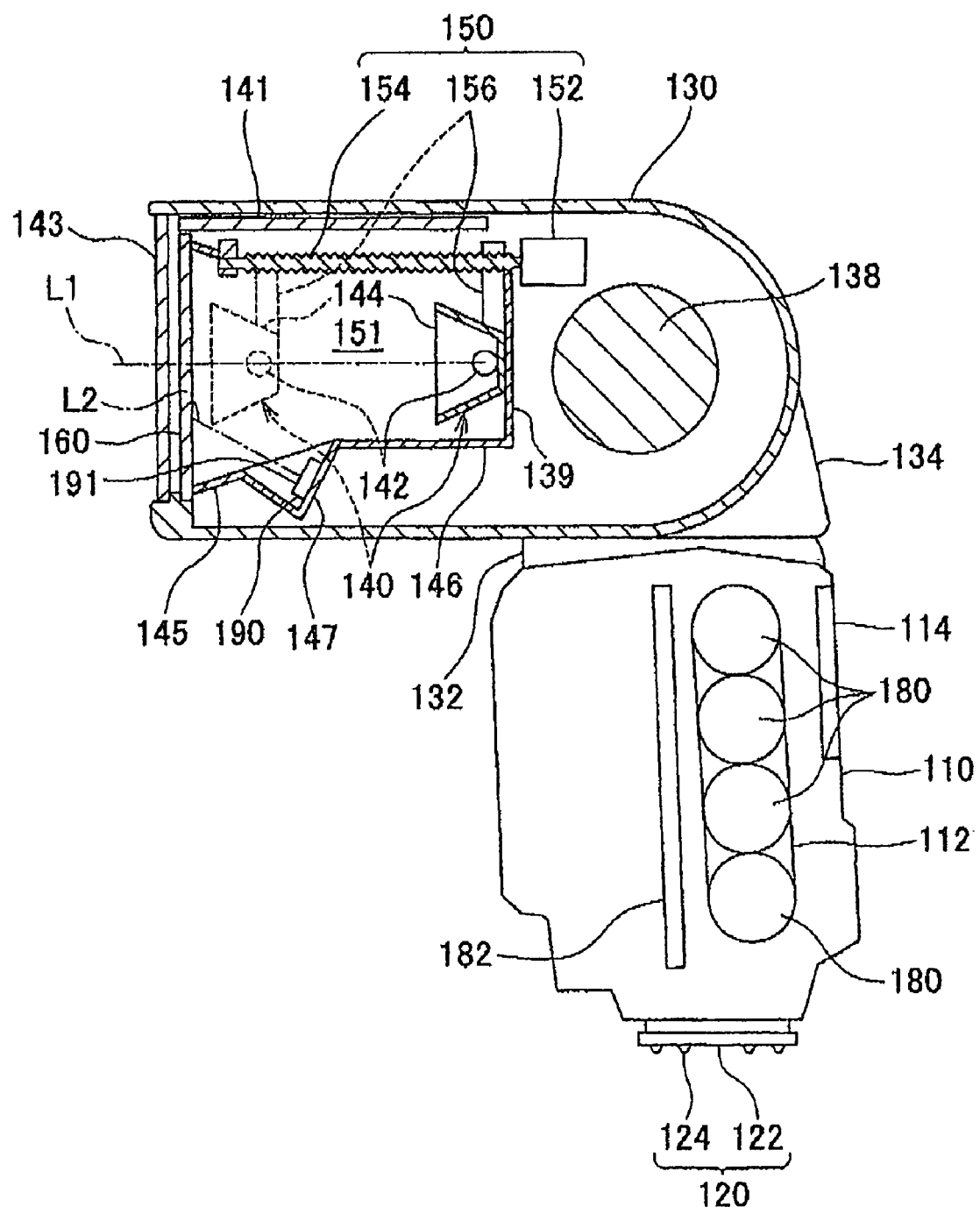
F I G . 3

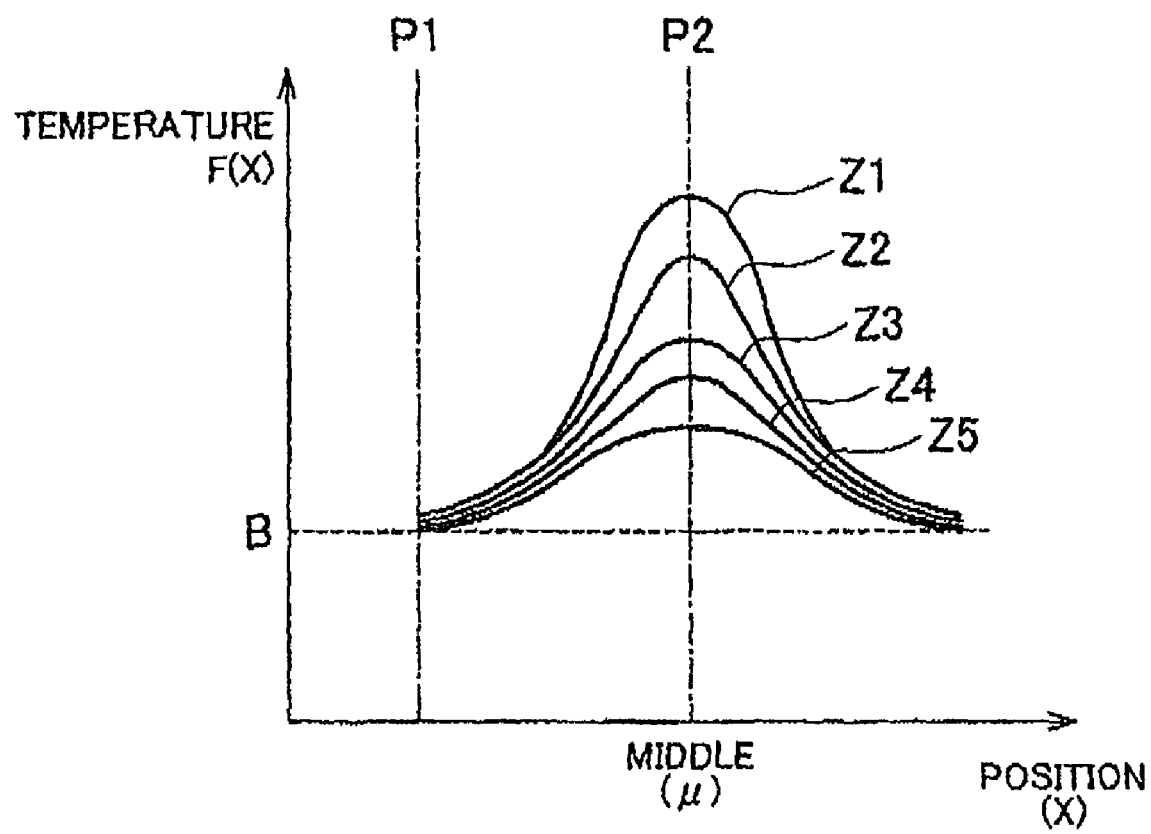
F I G . 5

LIGHTING APPARATUS

CROSS REFERENCE TO RELATED APPLICATION

The contents of the following patent applications are incorporated herein by reference:

Japanese Patent Application No. 2009-154284 filed on Jun. 29, 2009; and

Japanese Patent Application No. 2010-133259 filed on Jun. 10, 2010.

BACKGROUND

1. Technical Field

The present invention relates to a lighting apparatus.

2. Description of the Related Art

A known flash device controls the emission of a flash based on the estimated temperature of a heat generating element, for example, as disclosed in Japanese Patent Application Publication No. 05-216096. Another known flash device measures the temperature of a heat generating element by using a contact temperature sensor, for example, as disclosed in Japanese Patent Application Publication No. 05-333408.

SUMMARY

It is an object of an aspect of the innovations herein to provide a lighting apparatus that is capable of accurately measuring the temperature of an optical member that transmits therethrough light emitted from a light source without blocking the optical path of the light. This and other objects can be achieved by combinations described in the independent claims. The dependent claims define further advantageous and exemplary combinations of the innovations herein.

According to an aspect related to the innovations herein, one exemplary lighting apparatus (100) may include alight source (140) that emits light, an optical member (160) that transmits therethrough the light emitted from the light source, a temperature measuring section (190) that measures a temperature of a first measurement point on the optical member, a storing section (167) that stores therein profile information representing a correlation between the temperature of the first measurement point and a temperature of a second measurement point, where the second measurement point is on the optical member and separated away from the first measurement point, and a temperature determining section (166) that determines the temperature of the second measurement point based on (i) the temperature of the first measurement point measured by the temperature measuring section and (ii) the profile information stored in the storing section.

The summary clause does not necessarily describe all necessary features of the embodiments of the present invention. The present invention may also be a sub-combination of the features described above. The above and other features and advantages of the present invention will become more apparent from the following description of the embodiments taken in conjunction with the accompanying drawings.

The present invention can provide a lighting apparatus that can accurately measure the temperature of an optical member that transmits therethrough light emitted from a light source without blocking the optical path of the light.

BRIEF DESCRIPTION OF THE DRAWINGS

FIG. 2 is a perspective view illustrating the lighting apparatus 100.

FIG. 3 is a sectional side view illustrating the lighting apparatus 100.

FIG. 5 is a graph illustrating the relation between a vertical position in a Fresnel lens 160, a temperature, and the position of a discharge tube 142 in the direction in which an optical axis L1 extends.

DESCRIPTION OF EXEMPLARY EMBODIMENTS

Some aspects of the invention will now be described based on the embodiments, which do not intend to limit the scope of the present invention, but exemplify the invention. All of the features and the combinations thereof described in the embodiment are not necessarily essential to the invention.

Figure 1:
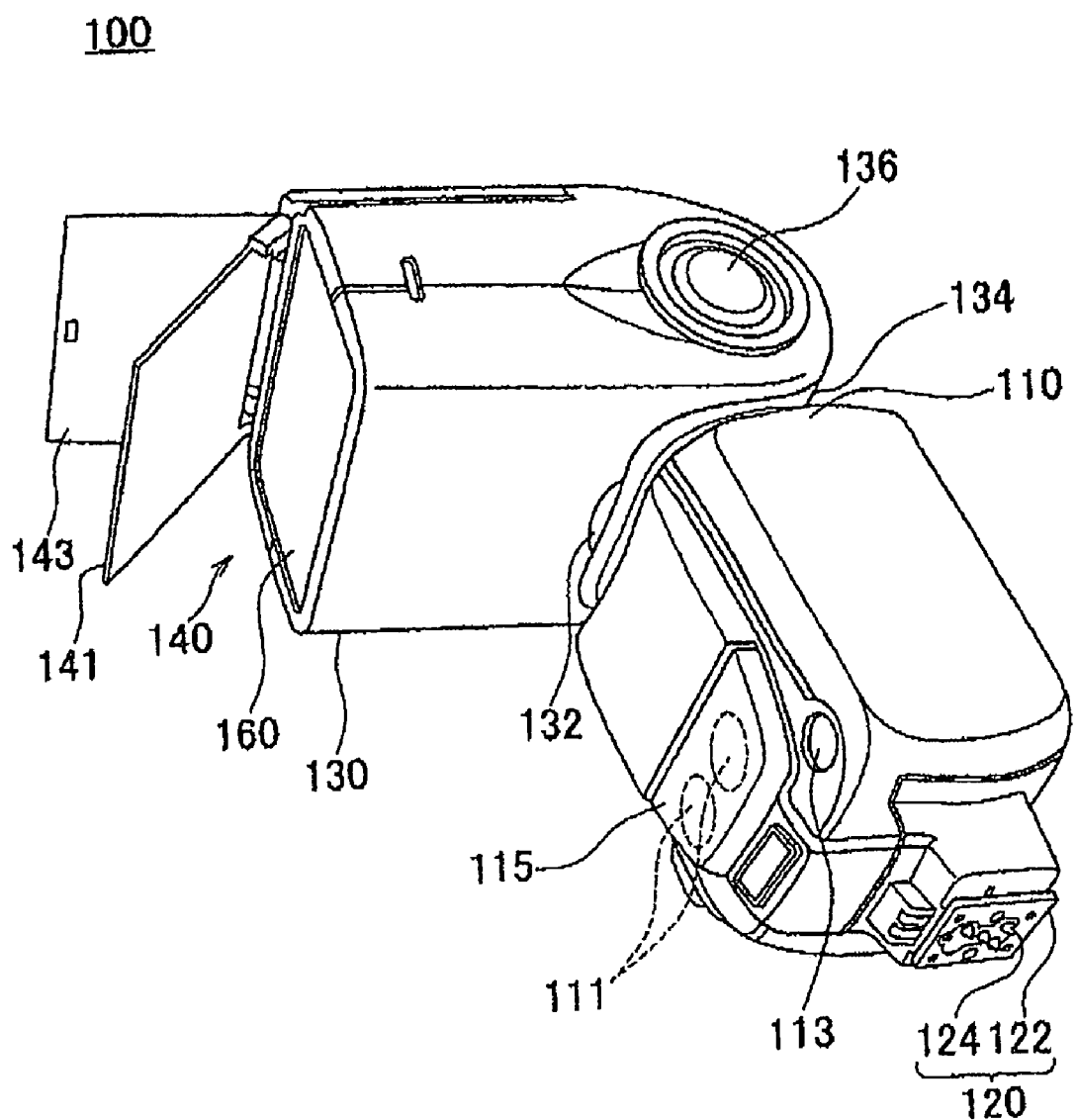
FIG. 1 is a perspective view illustrating a lighting apparatus 100.

FIG. 1 is a perspective view illustrating a lighting apparatus relating to an embodiment of the present invention. As shown in FIG. 1, a lighting apparatus 100 includes an immobile housing 110 and a mobile housing 130 that are coupled to each other.

The immobile housing 110 has an attachment portion 120 on the lower end surface thereof, and an auxiliary light source 111 and a remote-use ready light 113 on the front surface thereof. The attachment portion 120 includes an attachment leg 122 to be fitted into a hot shoe provided on a camera body and a contact 124 that transmits signals via the hot shoe. By fitting the attachment leg 122 into the hot shoe, the immobile housing 110 is secured onto the camera body.

The auxiliary light source 111 is covered by a transparent cover 115 and emits light according to the operation mode. For example, the auxiliary light source 111 illuminates an object when auto-focusing is performed to capture images of the object in a dark environment. The remote-use ready light 113 notifies a user that a main capacitor, which will be described later, has been fully charged when the user remotely operates the lighting apparatus 100.

The mobile housing 130 has a flash generator 140 on the front surface thereof, and a lock release button 136 on the side surface thereof. Note that the terms "front surface" and "side surface" are defined in terms of the state of the mobile housing 130 shown in FIG. 1. The mobile housing 130 also has a wide-angle diffuser plate 141 and a catch-light reflector plate 143 on the front side of the flash generator 140. The wide-angle diffuser plate 141 and the catch-light reflector plate 143 can be put away into the mobile housing 130, and are arranged on the front side of the flash generator 140 or put away into the mobile housing 130 as required.

The mobile housing 130 includes a horizontal rotator 132 and a vertical rotator 134 that are positioned in the vicinity of the back end thereof. The lower end of the horizontal rotator 132 is coupled to the upper end surface of the immobile housing 110, and the upper end of the horizontal rotator 132 is coupled to the mobile housing 130 via the vertical rotator 134. In other words, the mobile housing 130 is coupled to the immobile housing 110 via the horizontal rotator 132 and the vertical rotator 134 in such a manner as to be capable of rotating horizontally and vertically. Thus, the object can be illuminated directly by directing the flash generator 140 towards the object and indirectly by directing the flash generator 140 in a different direction than towards the object.

The horizontal and vertical rotators 132 and 134 remains stationary at a predetermined position by engaging with a lock mechanism and is allowed to rotate when the user operates the lock release button 136. Thus, the mobile housing 130 is prevented from moving unexpectedly.

The flash generator 140 includes a Fresnel lens 160 provided on the front surface of the mobile housing 130. The flash generator 140 also includes a light source, which will be described later, provided inside the mobile housing 130. The flash generator 140 directs the flash emitted from the light source in the direction perpendicular to the Fresnel lens 160.

FIG. 2 is a back perspective view illustrating the lighting apparatus 100. As shown in FIG. 2, the immobile housing 110 has a display section 202 and an operating section 204 on the back surface thereof. The display section 202 includes a liquid crystal display panel 114 and a ready light 116. The operating section 209 includes a plurality of buttons 118 and a dial 119.

FIG. 3 is a sectional side view illustrating the lighting apparatus 100. As shown in FIG. 3, the immobile housing 110 has therein a battery chamber 112, batteries 180 housed within the battery chamber 112, and an electronic circuit 182 operating with the power supplied from the batteries 180. The electronic circuit 182 includes a voltage boost circuit that generates a high voltage to be supplied to the flash generator 140, in addition to a CPU, which will be described later, that controls the lighting apparatus 100, and a communication device that manages the communication with the camera body.

The mobile housing 130 has therein a main capacitor 138 that supplies power to the flash generator 140, in addition to the flash generator 140. The main capacitor 138 is swiftly charged by the high voltage applied by the voltage boost circuit included in the electronic circuit 182. The main capacitor 138 is immediately discharged on reception of a flash generating instruction from the electronic circuit 182.

The flash generator 140 includes a discharge tube 142, for example, a xenon tube that generates a flash, and a reflector umbrella 144 that reflects the flash generated by the discharge tube 142. The discharge tube 142 causes a discharge to generate a flash, when applied with a high voltage by the main capacitor 138. The reflector umbrella 144 opens towards the front side of the flash generator 140, and guides the flash emitted from the discharge tube 142 towards the front side of the flash generator 140. Note that the optical axis L1 of the flash goes through the center portion of the Fresnel lens 160.

The mobile housing 130 also has therein a moving mechanism 150 that moves the flash generator 140 in the direction in which the optical axis L1 of the flash extends. The moving mechanism 150 includes a motor 152, a ball screw 154 that is rotated by the motor 152, and a support 156 that couples the flash generator 140 to the ball screw 154.

The motor 152 is positioned behind and above a movable space 151 in which the flash generator 140 can move. The rotation shaft of the motor 152 is provided so as to extend parallel to the optical axis L1. The rotation shaft of the motor 152 is threaded to form the ball screw 154. Thus, the ball screw 154 extends parallel to the optical axis L1 from behind and above the movable space 151 towards the front side of the movable space 151.

The support 156 is a plate-like member. The upper end of the support 156 is screwed with the ball screw 154, and the lower end of the support 156 is coupled to the upper surface of the reflector umbrella 144. The support 156 is slidably fitted into a guide bar that is positioned parallel to the ball screw 154. Thus, when the ball screw 154 is rotated by the motor 152, the support 156 and the flash generator 140 move in the direction in which the optical axis L1 extends.

The mobile housing 130 has a wall 139 provided therein to separate the flash generator 140 and the main capacitor 130 from each other. The wall 139 extends as far as reaching the lower edge of the Fresnel lens 160 on the lower side of the movable space 151.

Here, a portion of the wall 139 that is positioned below the movable space 151 is divided into a rear portion 146 and a front portion 115. The rear portion 146 extends parallel to the optical axis L1 from the back end of the movable space 151 to the middle of the movable space 151 in the front-back direction. The front portion 145 extends at an angle with respect to the optical axis L1 in such a manner as to move away from the optical axis L1, from the middle of the movable space 151 in the front-back direction to the front end of the movable space 151. The front portion 145 has a depression 147 formed therein. The depression 147 is depressed in such a direction as to move away from the optical axis L1. The depression 147 has a temperature sensor 190 disposed therein. The temperature sensor 190 is a infrared radiant thermometer, and receives infrared light emitted from a to-be-measured object and measures the temperature of the to-be-measured object based on the amount of the received infrared light.

A light receiving surface 191 of the temperature sensor 190 faces the center portion of the Fresnel lens 160. Stated differently, a measurement optical axis L2, which extends from the center portion of the light receiving surface 191 of the temperature sensor 190 in the normal direction, reaches the center portion of the Fresnel lens 160 and intersects with the optical axis L1. Thus, the temperature sensor 190 receives the infrared light emitted from the center portion of the Fresnel lens 160. The temperature sensor 190 measures the temperature of the center portion of the Fresnel lens 160 based on the amount of the received infrared light.

Figure 4:
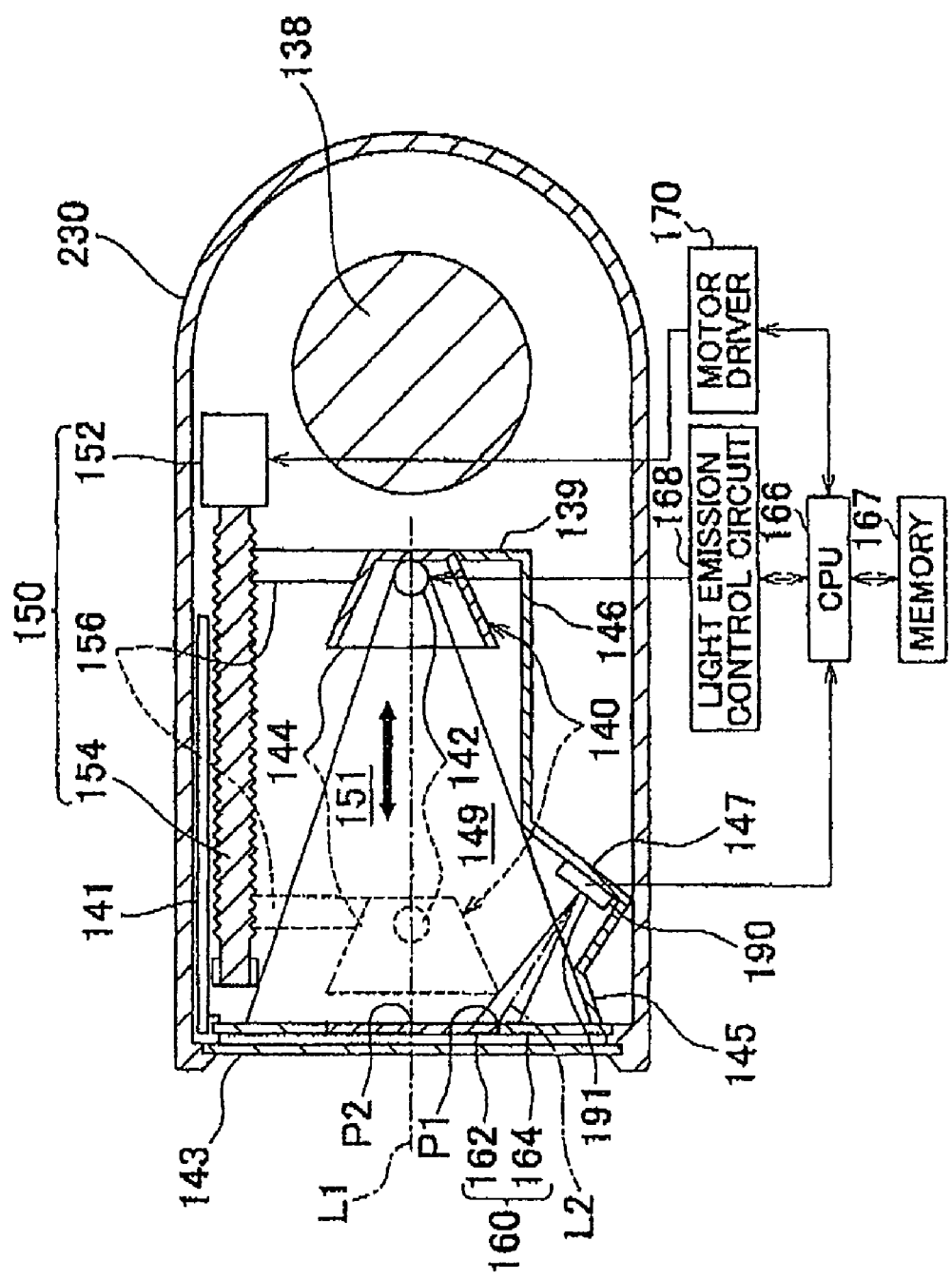
FIG. 4 is a sectional side view illustrating a mobile housing 130.

FIG. 4 is a sectional side view illustrating the mobile housing 130. As shown in FIG. 4, the Fresnel lens 160 has a collecting region 362 and a diffusing region 164 surrounding the collecting region 162. The collecting region 162 is a rectangular region and centers around the center portion of the Fresnel lens 160. The collecting region 162 has substantially the same area and shape as the front end of the reflector umbrella 144, and collects the flash emitted from the discharge tube 192. The diffusing region 164, on the other hand, diffuses the flash emitted from the discharge tube 142.

The temperature sensor 190 is arranged such that the measurement optical axis L2 extends through the boundary between the collecting region 162 and the diffusing region 164 of the Fresnel lens 160. Here, the intersection of the measurement optical axis L2 with the Fresnel lens 160 is referred to as a first measurement point P1, which will be described later.

The depression 147 formed in the front portion 145 is positioned below the optical path 199 of the flash, and the light receiving section of the temperature sensor 190 disposed within the depression 147 is thus outside the optical path 149 of the flash. The light receiving section of the temperature sensor 190 is also positioned below the movable space 151 of the flash generator 140, that is to say, outside the movable space 151.

The above-mentioned electronic circuit 182 includes a CPU 166, a memory 167, a light emission control circuit 168, and a motor driver 170. The CPU 166 controls the entire lighting apparatus 100. The CPU 166 has a temperature detector circuit that detects the highest temperature in the Fresnel lens 160. The memory 167 stores therein an arithmetic expression that represents the correlation between the temperature measured at the first measurement point P1 and the highest temperature. This arithmetic expression is used by the temperature detector circuit to determine the highest temperature in the Fresnel lens 160 (that is to say, the temperature at a measurement point P2, which will be described later).

The light emission control circuit 168 includes a voltage boost circuit that controls the discharging and charging of the main capacitor 138 and a light source control circuit that turns on/off the light emission from the discharge tube 142 and regulates the amount of the light emitted. The motor driver 170 turns on/off the motor 152 and switches the rotation direction.

The temperature sensor 190 is connected to the CPU 166, and outputs the measured temperature values to the CPU 166. The tempera tore detector circuit in the CPU 166 determines the highest temperature in the Fresnel lens 160 based on the temperature at the first measurement point P1 measured by the temperature sensor 190 and the arithmetic expression stored in the memory 167. How to determine the highest temperature will be described later in detail.

When the highest temperature of the Fresnel lens 160 is equal to or higher than a threshold value, the CPU 166 outputs an instruction to the light emission control circuit 168 to prohibit the discharge tube 142 from emitting light and to prohibit the main capacitor 138 from being discharged. When the temperature measured by the temperature sensor 190 is equal to or higher than a threshold value, the CPU 166 may cause the display section 202 to display a warning or cause a speaker to generate an alert.

FIG. 5 is a graph illustrating the relation between the vertical position X in the Fresnel lens 160, the temperature F(X), and the distance between the discharge tube 142 and the Fresnel lens 160. Note that the discharge tube 142 emits a constant amount of light. The curve Z1 represents the temperature F(X) of the Fresnel lens 160 observed when the discharge tube 142 is at the front end of the movable space 151 (hereinafter, referred to as "the wide-angle end"). On the other hand, the curve Z5 represents the temperature F(X) of the Fresnel lens 160 observed when the discharge tube 142 is at the back end of the movable space 151 (hereinafter, referred to as "the telescopic end").

The curves Z2, Z3 and Z4 each represent the temperature F(X) of the Fresnel lens 160 observed when the discharge tube 142 is positioned at an intermediate point between the wide-angle end and the telescopic end. The distance between the discharge tube 142 and the Fresnel lens 160 increases in the stated order of Z2, Z3, and Z4.

As seen from the graph in FIG. 5, the temperature F(X) of the Fresnel lens 160 takes the highest value at the vertical middle portion of the Fresnel lens 160. Furthermore, the temperature F(X) of the Fresnel lens 160 increases as the distance between the discharge tube 192 and the Fresnel lens 160 decreases. Furthermore, the temperature rises as the position moves from the upper and lower ends to the middle in the Fresnel lens 160, and the temperature rise gradient increases as the distance between the discharge tube 142 and the Fresnel lens 160 decreases.

Figure 6:
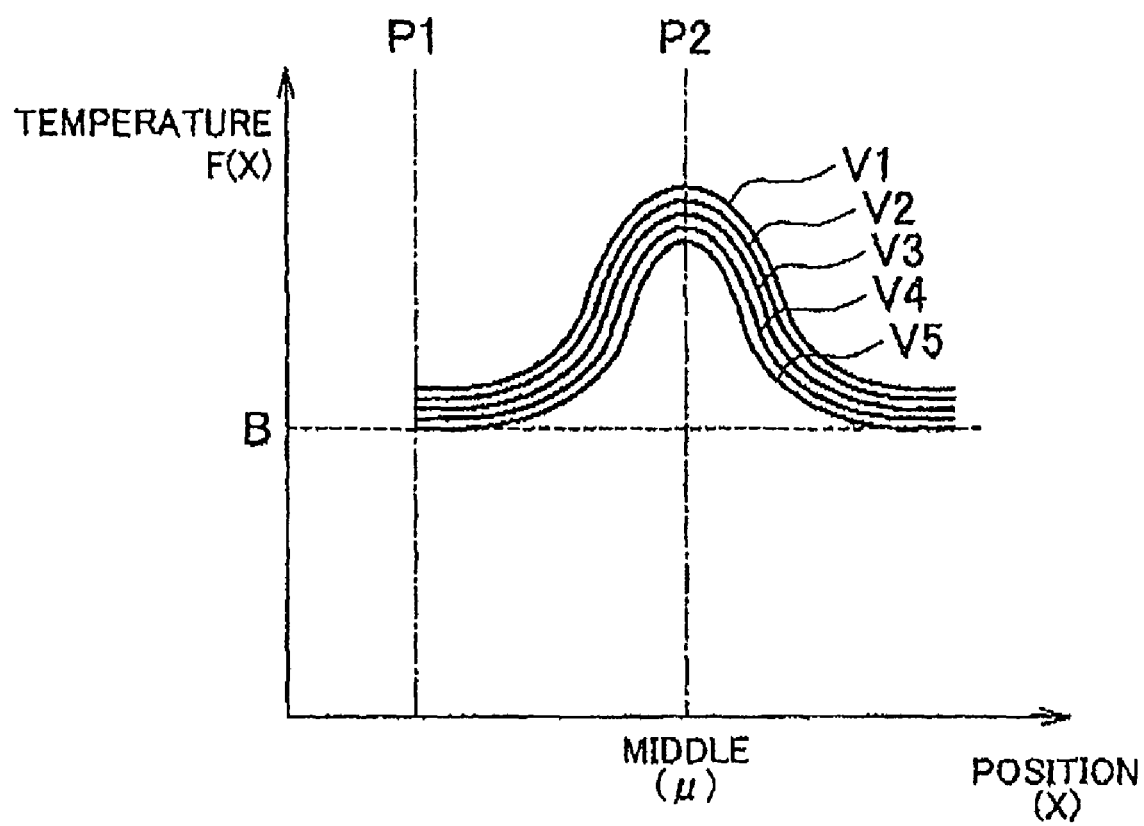
FIG. 6 is a graph illustrating the relation between the vertical position in the Fresnel lens 160, the temperature, and the amount of light omitted by the discharge tube 142.

FIG. 6 is a graph illustrating the relation between the vertical position X in the Fresnel lens 160, the temperature F(X), and the amount of the light omitted from the discharge tube 142. Note that the distance between the discharge tube 142 and the Fresnel lens 160 is set constant. Here, the curve V1 represents the temperature F(X) of the Fresnel lens 160 when the discharge tube 142 is configured to emit the maximum amount of light. On the other hand, the curve V5 represents the temperature F(X) of the Fresnel lens 160 when the discharge tube 142 is configured to emit the minimum amount of light.

The curves V2, V3 and V4 each represent the temperature F(X) of the Fresnel lens 160 when the discharge tube 142 is configured to emit an intermediate amount of light between the maximum and the minimum. The amount of the light emitted from the discharge tube 142 decreases in the stated order of V2, V3, and V4.

The memory 167 stores therein the following arithmetic expression, which is obtained by approximating the profiles shown in FIGS. 5 and 6.

$$F(x) = A \cdot \frac{1}{\left(1 / \sqrt{2\pi}\, \sigma\right)} e^{-\frac{(X-\mu)^2}{2\sigma^2}} + B$$

In the above expression, A denotes a constant that varies in proportion to the amount of the light emitted from the discharge tube 192 and is calculated by the CPU 166 based on the amount of the light emitted by the discharge tube 142, which is received from the light emission control circuit 168, B denotes the temperature measured at the first measurement point P1, which is received by the CPU 166 from the temperature sensor 190, σ denotes a constant that varies in proportion to the distance between the Fresnel lens 160 and the discharge tube 142 and is calculated by the CPU 166 based on the information received from the motor driver 170 that indicates the position of the discharge tube 192, X denotes a constant representing the distance from the lower end of the Fresnel lens 160, and μ denotes the distance between the lower end and the middle portion in the Fresnel lens 160.

To know the temperature of the center portion of the Fresnel lens 160, the lighting apparatus 100 relating to the present embodiment uses the temperature sensor 190 to measure the temperature B at the first measurement point P1 that is offset towards the lower side with respect to the middle portion of the Fresnel lens 160, instead of directly measuring the temperature of the middle portion of the Fresnel lens 160. The first measurement point P1 is not blocked by the flash generator 140 at the wide-angle edge. The lighting apparatus 100 then uses the expression representing the correlation between the measured temperature B and the temperature of the center portion (at the second measurement point P2) of the Fresnel lens 160 to calculate the temperature of the center portion of the Fresnel lens 160. Here, the center portion is more significantly influenced by the heat of the flash than the first measurement point P1, and thus exhibits the highest temperature in the entire Fresnel lens 160. Accordingly, the lighting apparatus 100 can detect the highest temperature of the Fresnel lens 160 without blocking the optical path of the flash emitted from the discharge tube 142. Note that it is not essential to designate the center portion of the Fresnel lens 160 or the portion of the Fresnel lens 160 that exhibits the highest temperature, as the second measurement point P2.

The lighting apparatus 100 relating to the present embodiment uses the thermal conductivity of the Fresnel lens 160 that is determined in advance by tests in order to derive the temperature of the center portion of the Fresnel lens 160 (the second measurement point P2) or the highest temperature from the temperature measured at the first measurement point P1 of the Fresnel lens 160. Stated differently, the lighting apparatus 100 directly measures a to-be-measured object or the Fresnel lens 160 to determine the highest temperature of the Fresnel lens 160. Therefore, the lighting apparatus 100 can reduce errors when compared with the case where the measurement points are indifferent parts, thereby more accurately detecting the highest temperature of the Fresnel lens 160.

Here, the correlation between the first measurement point P1 and the second measurement point P2, which is positioned in the center portion of the Fresnel lens 160, varies as the distance between the Fresnel lens 160 and the discharge tube 142 increases or decreases and as the amount of the light emitted from the discharge tube 142 increases or decreases. Taking this fact into consideration, the lighting apparatus 100 uses the thermal-conductivity-based arithmetic expression whose parameters include the distance between the Fresnel lens 160 and the discharge tube 142 and the amount of the light emitted from the discharge tube 192. Consequently, the lighting apparatus 100 can accurately detect the highest temperature of the Fresnel lens 160 irrespective of the variation of the position of the discharge tube 142 in the optical axis L1 direction and the amount of the light emitted from the discharge tube 142.

Furthermore, since the light receiving section of the temperature sensor 190 can be positioned outside the optical path 149 of the flash emitted from the discharge tube 142, the ambient temperature around the temperature sensor 190 can be prevented from rising. Accordingly, the measured value provided by the temperature sensor 190 contains reduced error components. As a consequence, the temperature sensor 190 can measure the temperature of the Fresnel lens 160 with improved accuracy.

Since the temperature sensor 190 is positioned outside the path along which the flash generator 140 moves, the temperature sensor 190 does not limit the movable range of the flash generator 140. In particular, the temperature sensor 190 does not limit the movement of the flash generator 140 towards the wide-angle end.

In the present embodiment, the temperature sensor 190 is an infrared radiant temperature sensor that receives infrared light from a to-be-measured object and measures the temperature of the to-be-measured object based on the amount of the received infrared light. The temperature sensor 190, however, may alternatively be a different type of radiant temperature sensor that receives visible light from a to-be-measured object and measures the temperature of the to-be-measured object based on the amount of the received visible light. The discharge tube 142 is realized by using a xenon tube that emits a flash to illuminate an object, but may alternatively be realized by using an LED.

In the present embodiment, the temperature of the second measurement point P2 is determined by using the arithmetic expression that is stored in the memory 167 and indicates the correlation between the first measurement point P1 and the second measurement point P2. Alternatively, however, the memory 167 may be configured to store therein a map or table indicating the correlation between the first measurement point P1 and the second measurement point P2, and the temperature of the second measurement point P2 may be determined by reading the temperature of the second measurement point P2 from the map or table.

For example, the memory 167 stores therein a map or table indicating such a correlation that the temperature of the second measurement point P2 is F1 when the value of A falls in the range of A1 to A2, the value of B falls in the range of B1 to B2, and the value of σ falls in the range of σ1 to σ2, and that the temperature of the second measurement point P2 is F5 when the value of A falls in the range of A2 to A3, the value of B falls in the range of B1 to B2, and the value of σ falls in the range of σ3 to σ4. In this case, the CPU 166 may determine the temperature of the second measurement point P2 by reading the temperature F(X) of the second measurement point P2 that is correlated in the map or table with the values of A, B and σ that are acquired from the light emission control circuit 168, the temperature sensor 190, and the motor driver 170.

Figure 7:
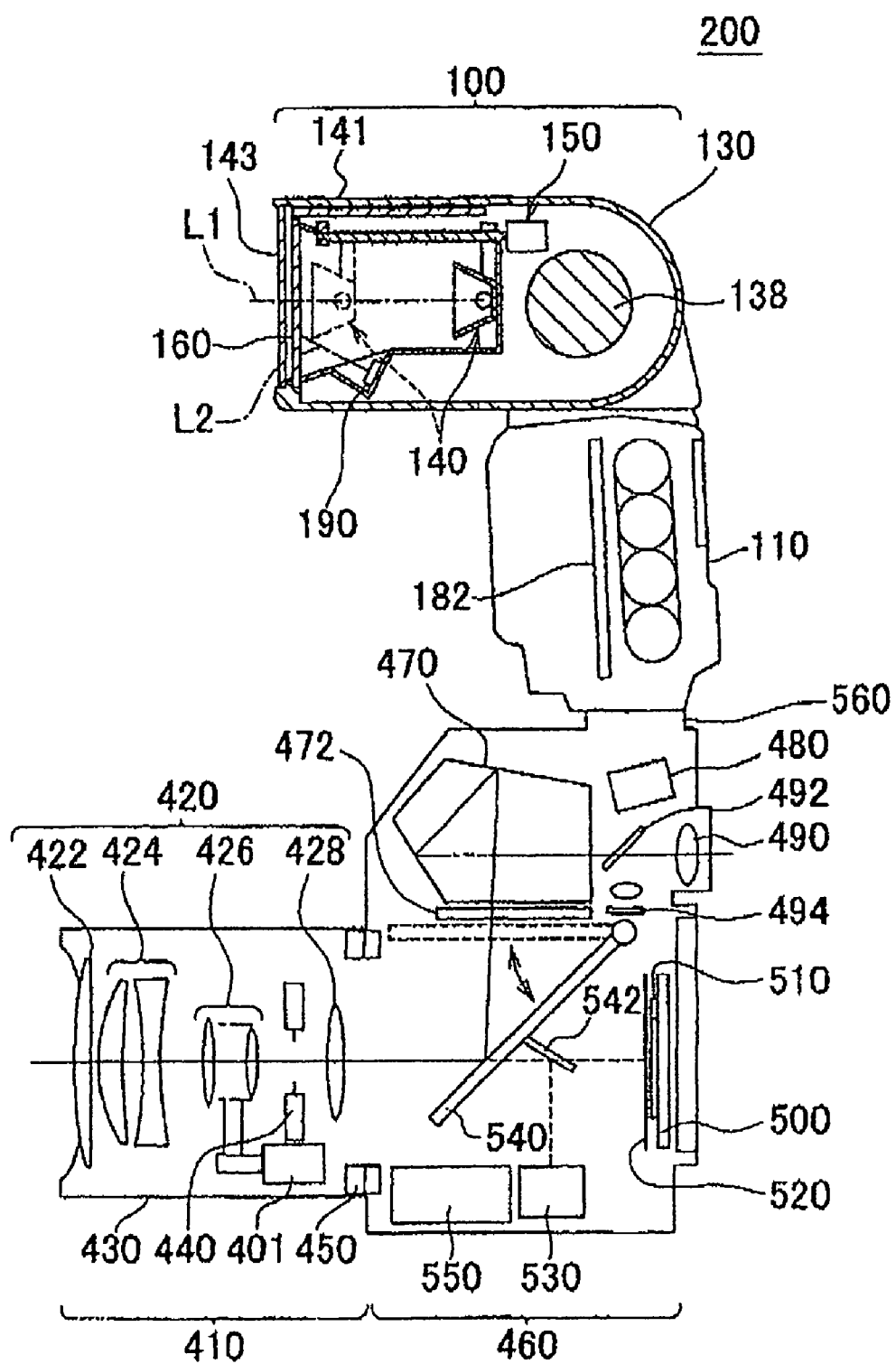
FIG. 7 is a vertical sectional view schematically illustrating the configuration of an image capturing apparatus 200 having the lighting apparatus 100 mounted thereon.

FIG. 7 is a vertical sectional view schematically illustrating the configuration of an image capturing apparatus 200 having the lighting apparatus 100 mounted thereon. As shown in FIG. 7, the image capturing apparatus 200 has a lens unit 410 and a body 460.

The lens unit 410 is detachably mounted onto the body 460 by means of a mount 450. The lens unit 410 includes optical members 420, a lens barrel 430 having the optical members 420 housed therein, and a motor 401 that is provided inside the ions barrel 430 and drives the optical members 420. On the other hand, the body 460 includes a main mirror 540, a pentaprism 470, and an optical system including an eyepiece optical system 490.

The main mirror 540 moves between a standby position and an image-capturing position (represented by the dotted line in FIG. 7). The main mirror 540 is arranged at an angle on the optical path of incoming light that enters through the lens unit 410 while being at the standby position and stays lifted to avoid the incoming light while being at the image capturing position. While being at the standby position, the main mirror 540 guides most of the incoming light to the pentaprism 470 positioned thereabove. The pentaprism 470 emits the reflection of the incoming light towards the eyepiece optical system 490. Therefore, the user can view through the eyepiece optical system 490 a normal image showing the image on a focusing screen 472.

The rest of the incoming light is guided to an optical measuring unit 480 via the pentaprism 470. The optical measuring unit 480 measures the intensity and intensity distribution of the incoming light. Between the pentaprism 470 and the eyepiece optical system 490, a half mirror 492 is disposed which overlays the display image formed in a liquid crystal finder 494 onto the image from the focusing screen 472.

The main mirror 540 has a sub mirror 542 on the back surface thereof that faces away from the entrance surface of the incoming light. The sub mirror 542 guides a part of the incoming light that has transmitted through the main mirror 540 to a distance measuring unit 530 provided therebelow. Thus, the distance measuring unit 530 measures the distance to the object when the main mirror 540 is in the standby position. When the main mirror 590 is in the image-capturing position, the sub mirror 542 is also off the optical path of the incoming light.

Behind the main mirror 540 relative to the incoming light, a shutter 520, an optical filter 510, and an image capturing element 500 are arranged in the stated order. The main mirror 540 moves to the image-capturing position immediately before the shutter 520 is released. Thus, when the shutter 520 is released, the incoming light travels straight to enter the image capturing element 500. In this way, the image formed by the incoming light is converted into electrical signals.

The lens unit 410 has an optical system constituted by a front lens 422, a compensator lens 424, a focusing lens 426, and a main lens 428, which are arranged in the stated order in the lens barrel 430 from the left side in FIG. 7 or the light entrance end. This optical system is housed within the lens barrel 430. Between the focusing lens 426 and the main lens 428, an iris unit 440 is provided.

The lens unit 410 further has a motor 401 arranged in the lens barrel 430. The motor 401 is positioned below the focusing lens 426, which is arranged in the lens barrel 430 at substantially the middle in terms of the direction in which the optical axis extends and has a relatively small diameter. Thus, the motor 401 can be housed within the lens barrel 430 without increasing the diameter of the lens barrel 430, and moves back and forth the focusing lens 426 in the direction in which the optical axis extends.

The body 460 has therein a controller 550, which is positioned off the optical path of the above-mentioned optical system. The controller 550 not only controls the operations of the constituents within the body 460, but also controls the operations of the motor 401 in the lens unit 410 by exchanging electrical signals with the motor 401 via the mount 450.

The lighting apparatus 100 is mounted onto the image capturing apparatus 200 by fitting the attachment leg 122 into an accessory shoe 560 provided on the top portion of the body 460. As a result of this fitting, the immobile housing 110, which forms a single piece together with the attachment portion 120, is secured onto the body 460. The fitting also enables the lighting apparatus 100 to communicate with the controller 550 in the body 460 via the contact 124.

The controller 550 provides, via the contact 124, the lighting apparatus 100 with information including the distance to the object that is detected by the distance measuring unit 530 of the body 460 and the exposure. Thus, the lighting apparatus 100 controls when to emit light and how much light to emit, in conjunction with the operations of the body 460.

Figure 8:
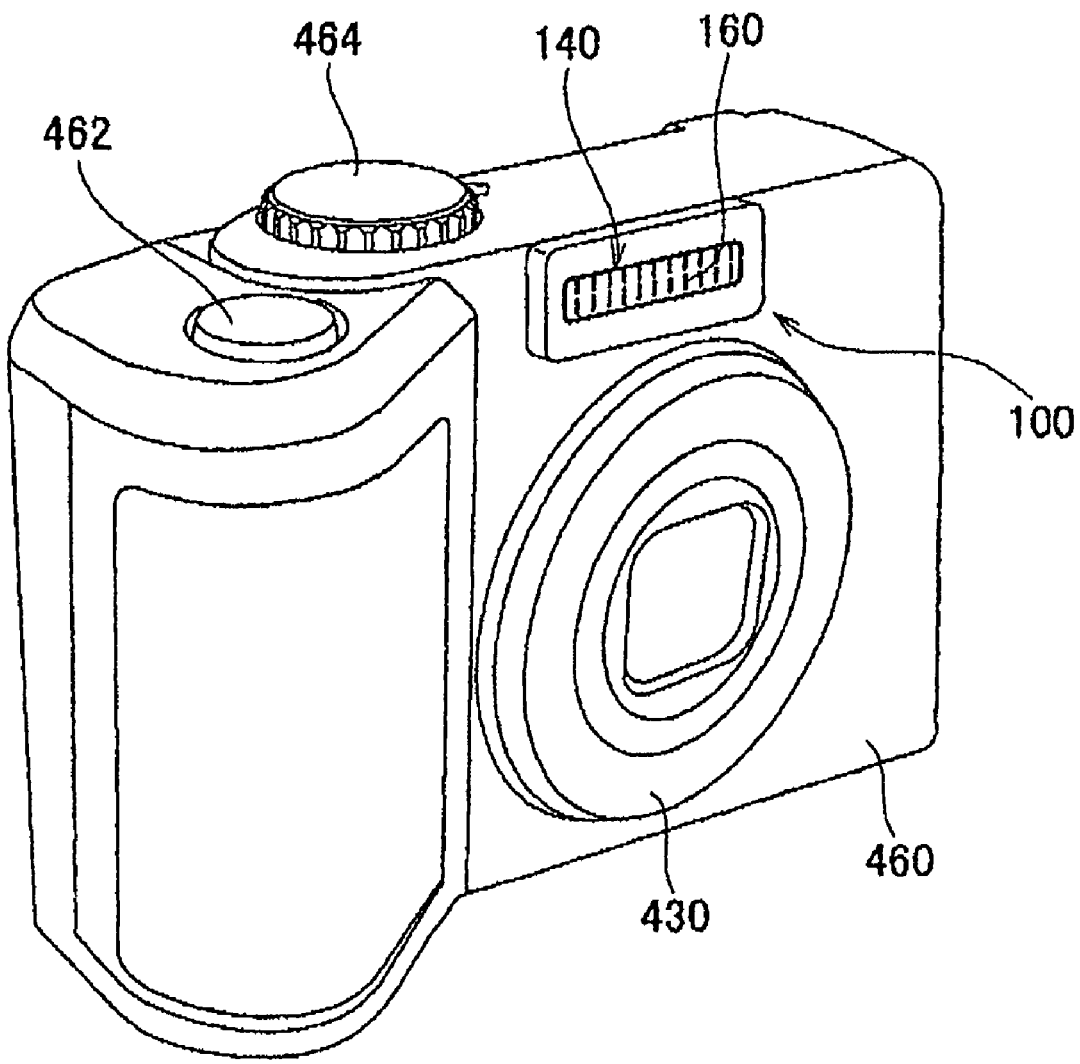
FIG. 8 is a perspective view schematically illustrating the configuration of an image capturing apparatus 300 relating to a different embodiment.

FIG. 8 is a perspective view schematically illustrating the configuration of a different image capturing apparatus 300. As shown in FIG. 8, the image capturing apparatus 300 has the body 460 including therein, for example, the shutter 462, a mode dial 464, and the lens barrel 430. The image capturing apparatus 300 further includes the lighting apparatus 100. The lighting apparatus 100 is arranged above the lens barrel 430 included in the body 160.

Figure 9:
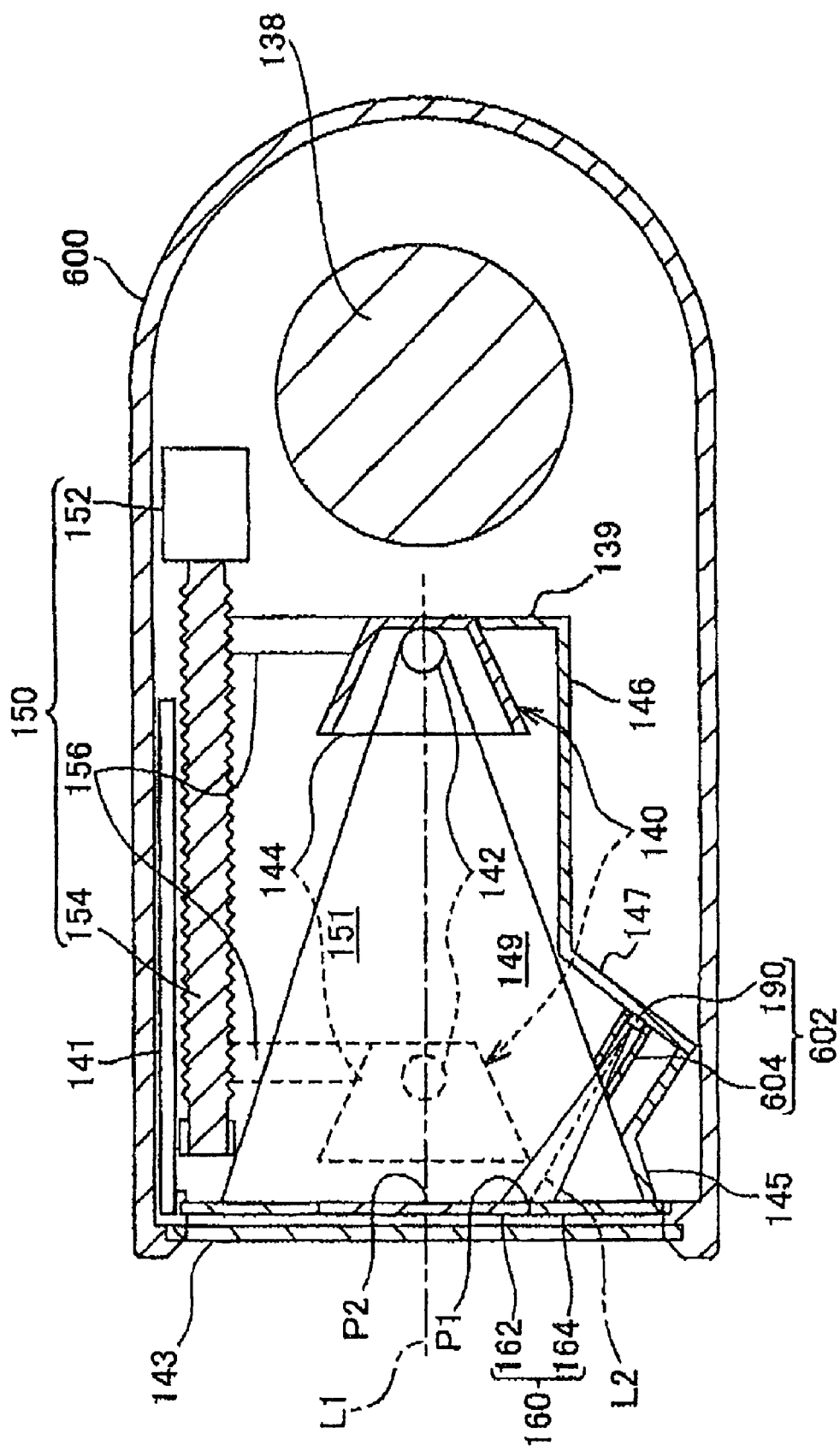
FIG. 9 is a sectional side view illustrating a mobile housing 600 relating to a different embodiment.
Figure 10:
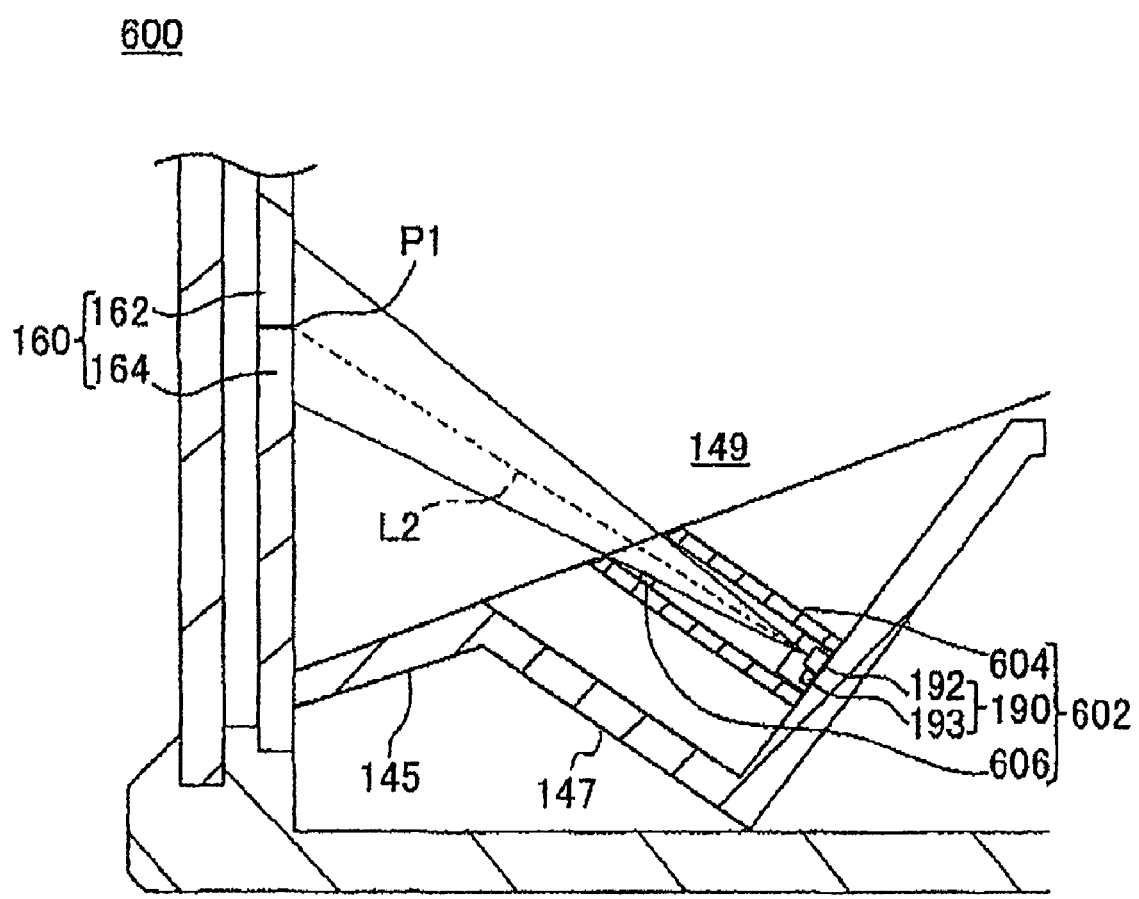
FIG. 10 is a sectional side view illustrating a temperature measuring section of the mobile housing 600 relating to the different embodiment.

FIG. 9 is a sectional side view to illustrate a temperature measuring section 602. FIG. 10 is an enlarged view showing the temperature measuring section 602. FIGS. 9 and 10 assign the same reference numerals as in FIG. 4 to the constituents shared by the mobile housings 600 and 130, and such constituents are not explained here. The temperature measuring section 602 shown in FIGS. 9 and 10 has a blocking wall 604 in addition to the temperature sensor 190, for example, shown in FIG. 3.

The blocking wall 604 is a cylindrical member that opens along the measurement optical axis L2, and made of a metal such as aluminum or copper. The temperature sensor 190 is provided at the bottom of the cylindrical blocking wall 604. The internal and external surfaces of the blocking wall 604 are painted black, so that the blocking wall 604 absorbs the received infrared light. Thus, the temperature sensor 190 is exposed to the infrared light that comes from a certain range within the solid angle formed by the temperature sensor 190 and the edge of the open end of the blocking wall 604. Accordingly, the temperature sensor 190 is adapted to measure the infrared light that comes from the range within the solid angle, or the infrared light from the region surrounding the first measurement point P1 in the Fresnel lens 160. Consequently, the temperature measuring section 602 realizes improved directional characteristics, thereby achieving higher measurement accuracy for the temperature at the first measurement point P1.

The blocking wall 604 is made as long as possible so that the open end is positioned as faraway from the temperature sensor 190 as possible provided that the blocking wall 604 does not block the optical path 149. When the longitudinal direction of the blocking wall 604 does not perpendicularly cross the optical path 149, the blocking wall 604 is shaped such that the lower portion is longer than the upper portion as shown in FIG. 10. Thus, the blocking wall 604 can further improve the directional characteristics of the temperature measuring section 602 without blocking the optical path 149.

The temperature sensor 190 is constituted by a thermopile 192 and a thermistor 193. The thermopile 192 has a hot junction that is covered with a infrared light absorber and a cold junction that is positioned so as not to be directly exposed to the infrared light. The hot junction receives the infrared light and converts the received light into heat. As a result, a temperature difference arises between the cold junction and the hot junction, and electromotive force is generated according to the temperature difference. The temperature sensor 190 outputs a measured temperature value T1 determined by the generated electromotive force.

The thermistor 193 is formed by an oxide semiconductor material whose resistance varies as the temperature varies. The thermistor 193 is in contact with the cold junction of the thermopile 192. The temperature sensor 190 outputs a measured temperature value T2 determined by the resistance of the thermistor 193. Stated differently, the temperature sensor 190 measures and outputs the temperature of the cold junction of the thermopile 192.

An ambient temperature sensor 606 has substantially the same configuration as the thermistor 193. The ambient temperature sensor 606 is provided at the top end of the blocking wall 604. Thus, the ambient temperature sensor 606 measures the temperature of the top portion of the blocking wall 604, which is very susceptible to the heat generated by the flash generator 140, and outputs a measured temperature value T3.

Referring to the temperature measuring section 602 shown in FIGS. 9 and 10, the thermopile 192 receives the infrared light from the blocking wall 604, in addition to the infrared light from the region surrounding the first measurement point P1. Accordingly, it is preferable to compensate for the infrared light from the blocking wall 604, in order to enable the temperature measuring section 602 to accurately measure the temperature at the first measurement point P1.

To perform such compensation, the CPU 166 first acquires the measured temperature value T2 provided by the thermistor 193, which indicates the temperature of the cold junction of the thermopile 192, and the measured temperature value T3 provided by the ambient temperature sensor 606, which indicates the temperature of the blocking wall 604. The CPU 166 then adds the measured temperature value T2 to and subtracts the measured temperature value T3 from the measured temperature value T1, to determine the temperature of the first measurement point P1. Since the temperature measuring section 602 includes the ambient temperature sensor 606, the influence of the temperature of the blocking wall 604 can be reduced from the measured temperature values provided by the temperature sensor 190, so that the temperature of the first measurement point P1 can be more accurately determined.

When the temperature sensor 190 outputs a value obtained by adding the measured temperature value provided by the thermistor 193 to the temperature measured value provided by the thermopile 192, the temperature at the first measurement point P1 can be determined by subtracting the measured temperature value T3 from the value output from the temperature sensor 190.

In the above-described embodiment, one ambient temperature sensor 606 is provided, for example. However, a plurality of ambient temperature sensors may be provided on the blocking wall 604. If such is the case, the temperature of the first measurement point P1 may be compensated by using the average among the measured temperature values provided by the plurality of ambient temperature sensors. Using the average among the measured temperature values provided by the plurality of ambient temperature sensors for the compensation can reduce the influence of the temperature variation across the blocking wall 604.

In the above-described embodiment, the blocking wall 604 is cylindrical. However, the blocking wall 604 may be differently shaped. For example, the blocking wall 604 is shaped like a semicylinder or flat plate. When shaped like a semicylinder or flat plate, the blocking wall 601 is provided between the temperature sensor 190 and the flash generator 140. By being provided between the temperature sensor 190 and the flash generator 140, the semicylinder- or flat-plate-shaped blocking wall 604 prevents the infrared light emitted from the flash generator 190 from reaching the temperature sensor 190. Thus, the temperature sensor 190 can measure the temperature of the Fresnel lens 160 with higher accuracy.

Figure 11:
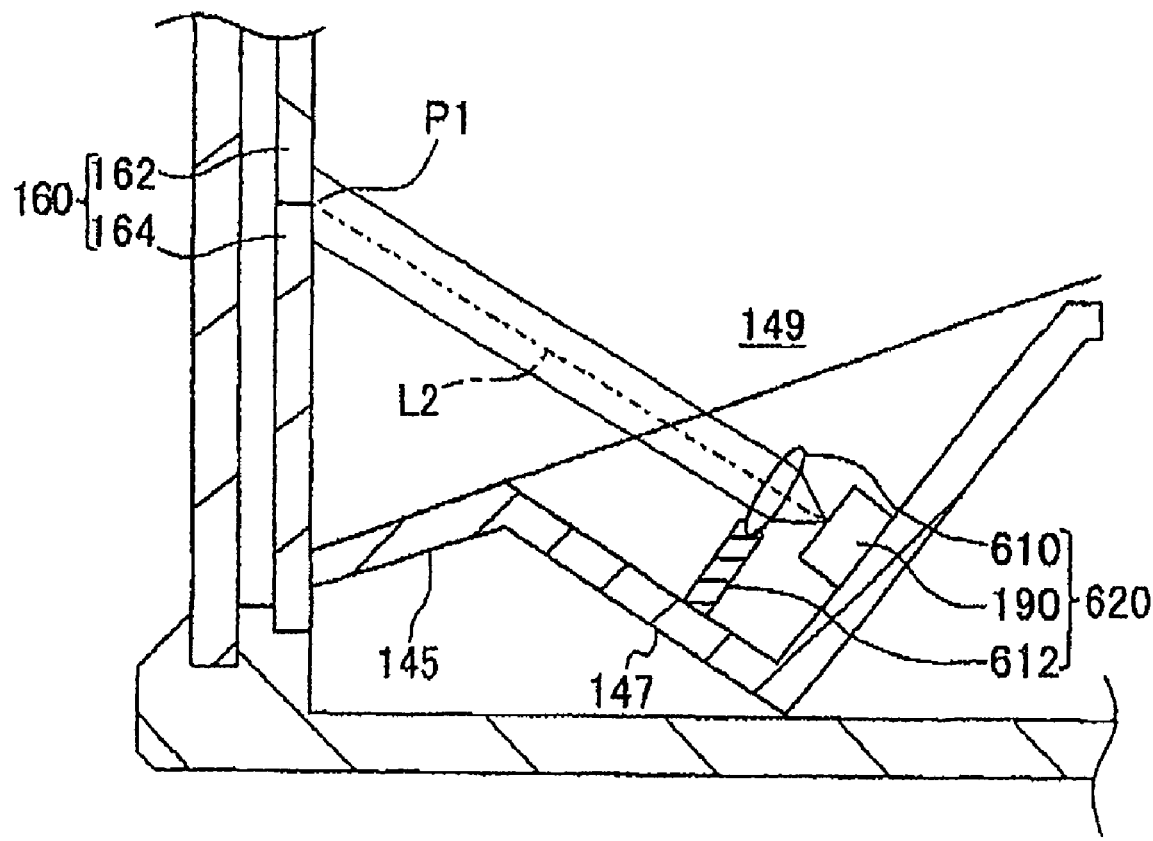
FIG. 11 is a sectional side view illustrating a temperature measuring section of the mobile housing 600 relating to a different embodiment.

FIG. 11 illustrates a different temperature measuring section 620. FIG. 11 assigns the same reference numerals as in FIG. 10 to the constituents shared by the temperature measuring section 602 shown in FIG. 10 and the temperature measuring section 620 shown in 11, and such common constituents will not be explained here. The temperature measuring section 620 includes an infrared light collecting lens 610 and a holder 612 in addition to the temperature sensor 190.

The holder 612 is provided in the depression 147 and holds the infrared light collecting lens 610. The infrared light collecting lens 610 collects the infrared light, and is a convex lens, for example. The infrared light collecting lens 610 collects the infrared light emitted from the region surrounding the first measurement point P1 onto the light receiving surface 191 of the temperature sensor 190. Thus, the infrared light collecting lens 610 prevents any other infrared light than the infrared light emitted from the region surrounding the first measurement point P1 from reaching the temperature sensor 190, thereby improving the directional characteristics of the temperature measuring section 620.

The infrared light collecting lens 610 may be held by the blocking wall 604 shown in FIG. 10, instead of being held by the holder 612. When the infrared light collecting lens 610 is provided on the blocking wall 604, the temperature measuring section 620 can achieve more improved directional characteristics.

Although some aspects of the present invention have been described by way of exemplary embodiments, it should be understood that those skilled in the art might make many changes and substitutions without departing from the spirit and the scope of the present invention which is defined only by the appended claims.

The claims, specification and drawings describe the processes of an apparatus, a system, a program and a method by using the terms such as operations, procedures, steps and stages. When a reference is made to the execution order of the processes, wording such as "before" or "prior to" is not explicitly used. The processes may be performed in any order unless an output of a particular process is used by the following process. In the claims, specification and drawings, a flow of operations may be explained by using the terms such as "first" and "next" for the sake of convenience. This, however, does not necessarily indicate that the operations should be performed in the explained order.

What is claimed is:

1. A lighting apparatus comprising:
a light source that emits light;
an optical member that transmits therethrough the light emitted from the light source;
a temperature measuring section that measures a temperature of a first measurement point on the optical member;
a storing section that stores therein profile information representing a correlation between the temperature of the first measurement point and a temperature of a second measurement point, the second measurement point being on the optical member and separated away from the first measurement point; and
a temperature determining section that determines the temperature of the second measurement point based on (i) the temperature of the first measurement point measured by the temperature measuring section and (ii) the profile information stored in the storing section.

2. The lighting apparatus as set forth in claim 1, wherein the temperature measuring section is positioned outside an optical path of the light emitted from the light source, and has a light receiving section that receives light from the first measurement point.

3. The lighting apparatus as set forth in claim 1, further comprising
an information obtaining section that obtains information about a position of the light source in a direction in which an optical axis extends and information about an amount of the light emitted from the light source, wherein
the profile information represents a correlation between the temperature of the first measurement point, the temperature of the second measurement point, the position of the light source in the direction in which the optical axis extends, and the amount of the light, and
the temperature determining section determines the temperature of the second measurement point based on the temperature of the first measurement point that is measured by the temperature measuring section, the information obtained by the information obtaining section, and the profile information stored in the storing section.

4. The lighting apparatus as set forth in claim 1, wherein the profile information is a table, a map or an arithmetic expression that represents the correlation between the temperature of the first measurement point and the temperature of the second measurement point.

5. The lighting apparatus as set forth in claim 1, wherein in the entire optical member, the second measurement point is positioned so as to be more significantly susceptible to heat of the light emitted from the light source than the first measurement point.

6. The lighting apparatus as set forth in claim 5, wherein the first measurement point is positioned on or in a vicinity of an periphery portion of the optical member, and the second measurement point is positioned on or in a vicinity of a center portion of the optical member.

7. The lighting apparatus as set forth in claim 1, wherein the temperature measuring section includes an infrared radiant temperature sensor that receives infrared light from the optical member and measures a temperature of the optical member based on an amount of the received infrared light.

8. The lighting apparatus as set forth in claim 7, wherein the temperature measuring section includes a limiting member that limits infrared light to be received by the infrared radiant temperature sensor to infrared light that is emitted from a region surrounding the first measurement point.

9. The lighting apparatus as set forth in claim 8, wherein the limiting member includes a blocking wall that blocks infrared light.

10. The lighting apparatus as set forth in claim 9, wherein the temperature measuring section further includes an ambient temperature sensor that measures a temperature of an ambient atmosphere, and
the ambient temperature sensor is positioned on the blocking wall so as to be closer to the first measurement point than to the infrared radiant temperature sensor.

11. The lighting apparatus as set forth in claim 8, wherein the limiting member includes a lens that collects infrared light onto the infrared radiant temperature sensor.

* * * * *